United States Patent Office 3,437,991
Patented Apr. 8, 1969

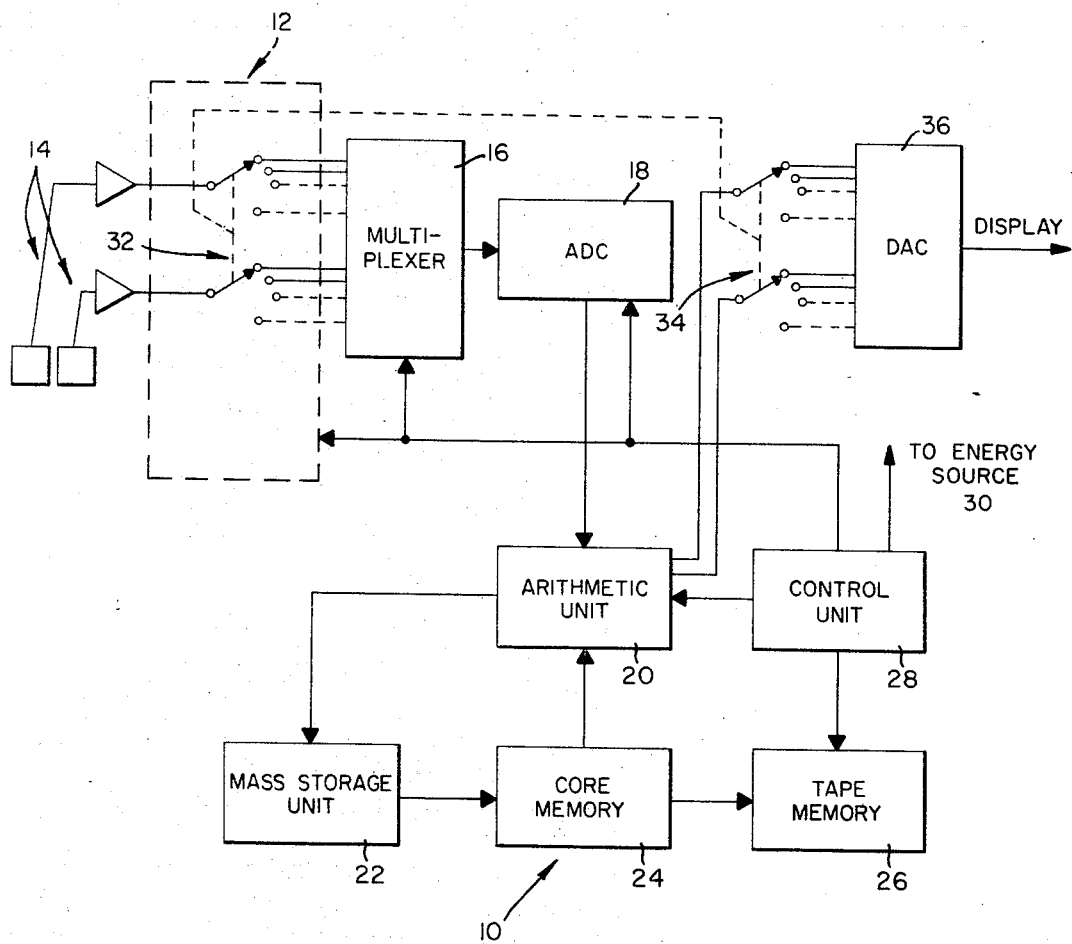

3,437,991
SYSTEM FOR RECORDING A MINOR NUMBER OF INFORMATION CHANNELS IN A MULTI-CHANNEL SUMMING RECORDING SYSTEM
James A. Porter, Jr., Houston, Tex., assignor to Mandrel Industries, Inc., Houston, Tex., a corporation of Michigan
Filed July 25, 1967, Ser. No. 655,916
Int. Cl. G01v 1/00
U.S. Cl. 340—15.5         4 Claims

ABSTRACT OF THE DISCLOSURE

Apparatus and process for recording one or more channels of information in a multichannel summing recorder, employing switch means disposed between the seismic analog inputs and the multiplexer to allow successive selection of a particular channel or channels of the multichannel recorder. The apparatus permits sequential selection of the particular channel or channels, sequential placement of the data in the successive channels of a temporary storage unit of the summing recorder, and final transfer of the entire sequence of channels of data from the storage unit to a permanent memory (e.g., tape) with the sequentially taken data recorded in side-by-side relationship.

Background of the prior art

In performing seismic surveying, particularly in marine exploratory surveying, it is often necessary or desirable to first conduct "single" channel sweeps, generally with a single geophone (and thus a single channel) wherein the geophone is dragged rapidly through the water. This allows the surveying company to appraise the area (i.e., to quickly obtain a perfunctory indication of the area to be surveyed without the expense of taking a complete multichannel survey). The areas of particular interest, and/or the entire area, can subsequently be surveyed by the usual full complement of channels at the usual slower speeds.

In performing such exploratory single-channel sweeps, it has heretofore been necessary to provide a special recorder of fewer channels, such as for example a single channel recorder, or to sequentially record successive single channel records in end-to-end relation on a wide multichannel tape conventionally utilized in multichannel summing recorders. Thus the recording of a single-channel of seismic data on multichannel tape results in the use of large amounts of tape which contain a comparatively small amount of useful data. On the other hand, the use of a special recorder to record the desired single channel of data results in the need to purchase the special single-channel recorder in addition to the multichannel recorder.

Furthermore, when processing records carrying data in end-to-end relation, computer time is substantially increased over that time necessary to process the same amount of data recorded side-by-side.

Summary of the invention

The present invention provides a process and apparatus, preferably utilizing an electronic or mechanical stepping switch means intermediate the seismic analog input means (the geophones and amplifiers) and the multiplexer of a conventional multichannel summing recorder. The switch means can have any desired number of contacts depending upon how many channels are to be recorded simultaneously during the initial sweep survey. For example, the number of channels, and thus contacts, in a 24-channel recording system can vary from one to twelve. In the process the switch is sequentially swept through all the channels and each record, taken sequentially in time, is placed in a temporary storage unit. After all channels are used, the data contained is simultaneously transferred from the storage unit to the permanent tape memory thus placing all the recordings on the tape in side-by-side and not end-to-end relation.

Accordingly, the invention allows for the use of a conventional multichannel summing recorder generally used on marine seismic surveying boats, while precluding the need for providing a separate recorder for conducting single-sweep surveys. Full use of all channels in the tape of the conventional recorder results in a relatively large savings in tape and processing time.

Brief description of the drawing

The single figure is a schematic block diagram of apparatus of the present invention.

Description of the preferred embodiments

Referring to the figure there is shown in simplified block diagram, a digital summing recorder 10. The recorder 10 may take the form of that described in U.S. patent application, Ser. No. 575,468, now abandoned, filed Aug. 26, 1966, and assigned to the assignee of the present invention. In conjunction with the recorder 10, there is included a stepping switch means 12 inserted between an analog seismic input means 14 and a multiplexer 16. By way of description of the recorder 10, the seismic input means 14 includes a conventional plurality of geophones and amplifier means. The input means 14, in turn extends to the various channels of the multiplexer 16. The stepping switch means 12 may comprise an electronic switch means. An analog-to-digital converter 18 is connected to the multiplexer 16 and also to an arithmetic unit 20, which unit generally provides for summing of successive records. The arithmetic unit 20 is operatively coupled to a mass storage unit 22 and to a core memory 24, which in turn are operatively coupled together. The core memory 24 is coupled to a tape memory 26 which permanently stores the summed records. A control unit 28 provides timing control signals to synchronize the various components of operation; e.g., it is coupled to the arithmetic unit 20, the tape memory 26, the analog-to-digital converter 18, the multiplexer 16, the switch means 12 and impulse or vibrator energy source 30.

In accordance with the invention, the stepping switch means 12 is inserted between the analog seismic input means 14 and the multiplexer 16. The switch means 12 is adapted to successively select a desired number of channels as well as to select a desired succession of such number of channels. Thus, data that has been generated by the impulse or vibratory energy source 30 is received by one or more geophones and amplifiers of the input means 14. The data is then routed to a stepping switch 32 of the switch means 12 and from thence to the input of the multichannel summing recorder 10. After each source impulse or excitation period, the switch 32 is advanced to the next channel or channels. An output is not produced to the tape memory 26 until all channel positions in the mass storage unit 22 are filled.

More particularly, a start excitation signal is sent to the impulse or vibratory energy source 30 from the control unit 28. If the recorder being used has a channel capability of twenty-four and only two channels are to be recorded as shown in the figure, the stepping switch 32 connects respective geophone and amplifiers of the input means 14 to channels one and two of the multiplexer 16 and all other inputs to the multiplexer are shorted. Signals received at the geophones and amplifiers of the input means 14 are thus amplified and subsequently temporarily stored as channels one and two within the mass storage unit 22. For the second recording, the stepping switch 32 selects channels three and four and connects them to the same two previously used geophones and amplifiers of the input means 14. However, during the second recording, the detected data is recorded and stored in the mass storage unit 22 as channels three and four thereof. The data previously recorded as channels one and two is unmodified as a result of adding it to all zeroes within the arithmetic unit 20. The process of selecting successive pairs of channels of the multichannel recorder 10 for the taking of successive records continues until all twenty-four channels of information have been recorded in the channels of the mass storage unit 22. Thereupon, the control unit 28 starts the tape memory 26 and places the contents of all channels of the mass storage unit 22 on the output tape memory 26. The result is that only one output record is made within tape memory 26 for twelve successive recording periods of two channels each. If a single detector station is used, (i.e., a single channel and switch 32) only one output record is made with all data in side-by-side relation for twenty-four successive recording periods of a single channel each.

To provide means for displaying the seismic signals the invention contemplates the further use of a switch means 34 coupled to the arithmetic unit 20 to obtain therefrom an output representing the incoming seismic data. The switch means 34 has the same number of contacts as switch means 32 and is actuated in unison therewith. A digital-to-analog converter 36 is coupled between the switch means 34 and a display device (not shown) whereby the channel, or channels, of data extracted via the switch means 34 are converted to an analog signal and introduced to the display device for visual monitoring of the records being taken by the single sweep technique.

Although the invention has been described herein with reference to a particular embodiment, it is to be understood that various modifications may be made thereto within the spirit of the invention, and thus it is not intended to limit the invention except as defined in the following claims.

I claim:

1. Apparatus for utilizing a select number of information channels in a multichannel digital field summing recorder system to record during field operation thereof, in side-by-side relation a succession of analog signals received in end-to-end relation by signal receiving means disposed to receive incoming seismic signals comprising; a switch device having at least one input coupled directly to the signal receiving means and which is coupled at its output to successive selected channels of the multichannel digital field summing recorder system, and control means integral with the digital field summing recorder for operating the switch device to sequentially receive at the input to the switch device the succession of analog signals in the end-to-end relation, wherein the signals are temporarily stored in the digital field summing recorder and thereafter simultaneously transferred in digital format to provide said side-by-side recording during operation of the multichannel digital field summing recorder.

2. Apparatus for utilizing a select number of information channels in a multichannel field summing recorder system to record during field operation thereof, in side-by-side relation a succession of analog signals received in end-to-end relation by signal receiving means disposed to receive incoming seismic signals comprising; a switch device having at least one input coupled to the signal receiving means and which is coupled at its output to successive selected channels of the multichannel field summing recorder system, control means integral with the field summing recorder for operating the switch device to sequentially receive at the input to the switch device the succession of analog signals in the end-to-end relation, wherein the signals are temporarily stored in the field summing recorder and thereafter simultaneously transferred to provide said side-by-side recording during operation of the multichannel field summing recorder, a second switch device integral with the multichannel field summing recorder and operable in conjunction with the first switch device to extract the signals in the side-by-side relation, and digital-to-analog converter means coupled to the second switch device for converting the side-by-side signals for display thereof.

3. A process for utilizing a minor number of channels of a multichannel field summing recorder during the operation of the field recorder, the recorder including seismic signal receiving means, comprising the steps of; receiving in end-to-end relation a series of reflected seismic signals directly from the seismic signal receiving means, introducing the series of seismic signals to respective channels of the multichannel field summing recorder in selected sequence, storing temporarily in digital format the end-to-end series of seismic signals as they are received and introduced, and simultaneously recording the series of temporarily stored digital seismic signals in side-by-side relation to preclude recording the reflected seismic signals in end-to-end format.

4. The process of claim 3 further comprising sequentially storing in digital format a first and at least a second reflected seismic signal in a first and a second channel respectively of the multichannel digital field summing recorder to define a plurality of channels of temporarily stored digital seismic records in the recorder, and simultaneously transferring the plurality of channels of temporarily stored digital data to record the data in side-by-side relation.

References Cited

UNITED STATES PATENTS 3,332,059    7/1967    Ritter _____ 340—15.5

RODNEY D. BENNETT, JR., *Primary Examiner.*

C. E. WANDS, *Assistant Examiner.*